Patented Apr. 15, 1947

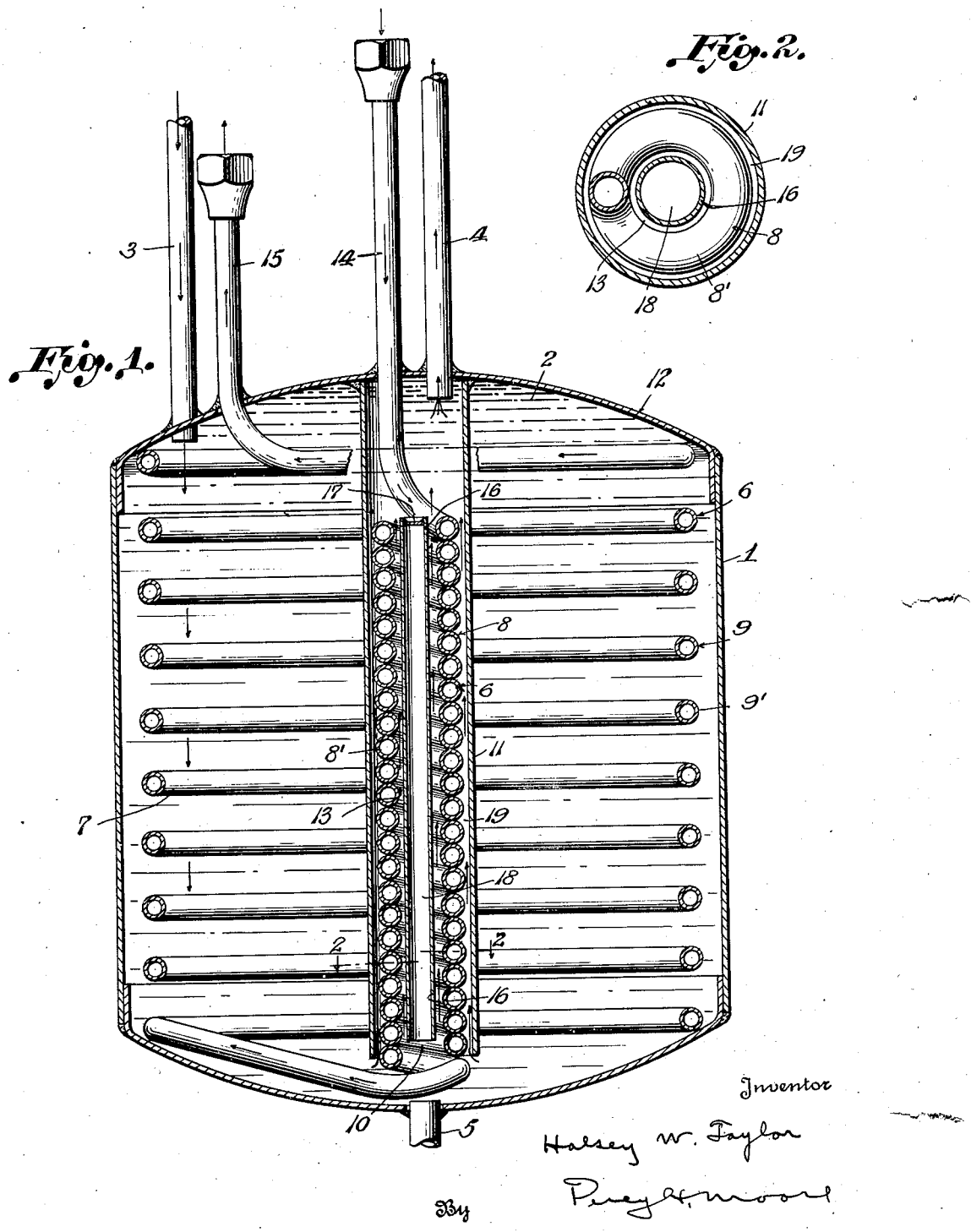

2,418,994

UNITED STATES PATENT OFFICE 2,418,994

WATER-COOLING APPARATUS

Halsey W. Taylor, Warren, Ohio, assignor to The Halsey W. Taylor Company, Warren, Ohio Application April 27, 1945, Serial No. 590,701

3 Claims. (Cl. 62—141)

My invention relates to an apparatus for cooling liquids.

One of the principal objects of the present invention is to provide an apparatus particularly adapted for cooling liquids in a pressure controlled drinking fountain, wherein the water outlet conduit and the refrigerant circulating conduit are so arranged and disposed as to afford a maximum of heat exchange efficiency.

Other objects and advantages of the invention will be apparent as the specification is considered with the accompanying drawings, wherein:

Figure 1 is a sectional elevation, partly broken away and partly in section, of a liquid cooling apparatus, the usual cabinet and refrigerant circulating mechanism being omitted; and Figure 2 is a section on the line 2—2 of Figure 1.

Referring more particularly to the drawings 1 denotes a tank for containing a supply of water or other liquid 2, and adapted to be mounted within a drinking fountain cabinet, not shown, such as illustrated in Patent No. 2,278,226, issued March 31, 1942, to Halsey W. Taylor of Warren, Ohio. Water to be cooled is conducted under pressure to the upper portion of the interior of the tank 1, by a pipe 3, leading from a water main, not shown. As water is drawn from time to time, from the upper portion of the tank, through a cold water outlet pipe 4, it will be automatically renewed by the pressure in the water main. A drain pipe 5 communicating with the interior of the tank, at the bottom thereof, provides means for emptying the tank.

Submerged in the tank 1 is a water cooling appliance 6 consisting of a continuous coil of pipe 7, comprising a tier 8 of inner superposed convolutions 8' and a second tier 9 of outer spaced convolutions 9' encircling the first tier, which act as the evaporator of the cooling system. The convolutions of the inner tier are closely coiled and superposed one upon the other thus providing a relatively water tight vertical passage 10, therethrough, for a purpose presently described, whereas the much larger convolutions of the outer tier extend almost to the side walls of the tank, and are spaced apart a considerable distance from each other.

A hollow preferably tubular member or casing 11, suitably and tightly secured at its upper end to and depending from the top 12 of the tank 1, extends down over and encloses the convolutions of the inner tier, the lower end of the member 11, which may consist of a section of pipe, terminating a short distance from the tank bottom. The convolutions of both the inner and outer tiers 8 and 9 respectively are concentrically disposed with respect to each other and to the axes of the member 11 and tank 1.

Concentrically disposed within the vertical passage 10, in spaced relation to the convolutions 8', is a tube 16, supported in any suitable manner, not shown. The upper end of the tube 16 lies substantially within the topmost convolution 8' and is closed by a disk 17 or the like. At its lower end the tube 16 terminates slightly above the lower end of tubular member 11 and, like the member 11, communicates freely with the interior of the tank 1. The tube 16 provides a chamber or trap 18 for containing a body of cold water and serves to reduce the vertical passage 10 to a comparatively narrow inner annular passage 13, extending between the tube 16 and the convolutions 8'. Furthermore the member 11 and convolutions 8' cooperate to provide an outer annular passage 19 therebetween.

Water conducted by inlet pipe 3 is discharged through the tank top 12 adjacent the side walls of the tank and the topmost convolution of outer tier 9. The water drops down in the tank over or adjacent the convolutions of the outer tier 9, and enters the open lower ends of members 11 and 16, until the member 16 is filled, and thereafter there will be a more or less continuous flow through member 11 and thence out through cold water outlet pipe 4. In its passage from the lower end to the upper end of the pipe 11, the pre-cooled water is split into two annular streams which flow upwardly through inner and outer annular passages 13 and 19 respectively. These two portions or streams are brought into intimate and confined heat exchange relation with the inner convolutions 8' of cooling pipe 7, while the water in the body of the tank, externally of the pipe 11, is in intimate contact with the latter and with the outer convolutions 9' of the pipe 7. From the upper end of chamber or pipe 11, water is conducted, more or less continuously, through the cold water outlet pipe 4 to a valve controlled bubbler, not shown. As the pre-cooled water from the body of the tank is progressively cooled during its upward passage through the pipe 11 the temperature of the water at the top of the pipe is lower than at any other point.

The column of cold water trapped in tube 16, by its concentrated and cumulative cooling effect on the stream flowing through the passage 13, materially assists in reducing the temperature of the water in the upper or outlet end of the member 11 to the desired degree.

A suitable condensing unit comprising a motor, compressor and condenser, such as disclosed in the prior patent to Taylor, previously referred to, is employed for circulating a liquid refrigerant through the pipe 7. Thus liquid refrigerant flows from the outlet end of the condensing unit, not shown, through a pipe 14, to and downwardly through the convolutions of inner tier 8, then upwardly through the convolutions 9' of outer tier 9 and finally back to the inlet or suction side of the condensing unit, through a suction outlet pipe 15. It will of course be understood, that, during its passage through the pipe 7, the refrigerant pre-cools the water in the body of the tank surrounding the outer tier of convolutions, and additionally cools the water in pipe 11, because of the evaporation of the refrigerant which is caused primarily by the heat from the water in the hollow member or pipe 11. Upon circling through the coil of pipe 7, the now vaporized refrigerant leaves the pipe 7 and tank 1 and is returned to the condensing unit where it is compressed, condensed and converted to liquid so that the cycle may be repeated.

The warm inlet water, entering the top of the tank is cooled by the refrigerant gas in the outermost section or tier of the coil 7. The pre-cooled water reaches the bottom of tank 1 and enters the open end of pipe 11, at a point adjacent to the center of the tank and at the bottom thereof, the coldest section of the tank body. En route through the passages 13 and 19, from the bottom of the tank to the top of pipe 11, the pre-cooled water is completely and progressively cooled by intimate contact with the convolutions 8'. The greatest efficiency and maximum cooling of the outlet water is attained by segregating the completely cooled water from the pre-cooled and confining the former within the restricted chambers afforded by the casing 11 and tube 16, and in which the refrigerant action of the convolution 8' is concentrated.

Having thus described my invention, what I claim is:

1. An apparatus for cooling liquid comprising a chambered body having a top and a bottom, a cooling coil providing a refrigerant circulating passage, said cooling coil comprising inner and outer tiers of convolutions submerged within said chambered body, a hollow member having its upper end secured to and closed by the top of said chambered body and at its lower end terminating adjacent to and opening into the bottom of the chambered body, the said inner tier of convolutions being encased within said hollow member, a tube encircled by said inner tier of convolutions, the upper end of said tube terminating a substantial distance from the top of said chambered body and means for supplying water to said chambered body and a cold water outlet in communication with the upper end of said hollow member.

2. An apparatus for cooling liquid comprising a chambered body, a cooling coil providing a refrigerant circulating passage, said cooling coil comprising inner and outer tiers of convolutions submerged within said chambered body, the convolutions of said inner tier being superposed, a hollow member having its upper end secured to and closed by the top of said chambered body and at its lower end terminating adjacent to and opening into the bottom of the chambered body, the said inner tier of convolutions encased within and spaced from said hollow member, a tube closed at one end and encircled by said inner tier of convolutions, means for supplying water to the upper portion of said chambered body and a cold water outlet extending through the top of said body in communication with the upper end of said hollow member.

3. An apparatus for cooling liquid comprising a chambered body, a cooling coil providing a refrigerant circulating passage, said cooling coil comprising outer pre-cooling convolutions and inner concentric cooling convolutions submerged within said chambered body, a hollow member sleeved over said inner convolutions and providing a vertical inner chamber for the pre-cooled liquid, said inner convolutions arranged in tightly coiled superposed relation and slightly spaced from the hollow member to separate the vertical inner chamber into out-flow passages on opposite sides of said inner convolutions, said hollow member having one end attached to and closed by said chambered body and at its other end said hollow member being in communication with the interior of said chambered body, a tubular member enclosed by said inner convolutions, said tubular member being closed at one end and at its other end being in open communication with said chambered body, means for conducting a supply of liquid to be cooled to said chambered body, and an outlet for the cooled liquid in communication with the upper end of said vertical inner chamber.

HALSEY W. TAYLOR.

REFERENCES CITED

The following references are of record in the file of this patent:

UNITED STATES PATENTS

| Number | Name | Date |
| --- | --- | --- |
| 706,902 | Condict | Aug. 12, 1902 |
| 2,270,540 | Mallory | Jan. 20, 1942 |
| 2,343,727 | Zenner | Mar. 7, 1944 |